June 9, 1942.  F. J. EVANS  2,285,649

CONTINUOUS FILTER

Filed July 3, 1939

INVENTOR
FRANKLIN J. EVANS
BY
HIS ATTORNEY

Patented June 9, 1942

2,285,649

UNITED STATES PATENT OFFICE

2,285,649

CONTINUOUS FILTER

Franklin J. Evans, Hazleton, Pa., assignor to Oliver United Filters Incorporated, Oakland, Calif., a corporation of Nevada Application July 3, 1939, Serial No. 282,710

3 Claims. (Cl. 210—199)

This invention relates in general to rotary drum filters and in particular to a valve mechanism by which the pressures on either side of the cake formed on the drum can be equalized just prior to the point of discharge so that the cake may be removed more readily.

Ordinarily the drum of a rotary drum filter is provided on its periphery with a plurality of independent filtrate compartments. Each of these compartments communicates with an automatic valve carried on one of the drum trunnions and by means of which each of the filtrate compartments may be successively subjected to either subatmospheric pressure, atmospheric pressure, or superatmospheric pressure, as desired, for the purpose of picking up a cake during the actual filtering cycle and for then discharging the cake from the drum. The capacity of a filter of this type is somewhat restricted and therefore filters have recently been built wherein the drum is formed on its periphery with individual compartments, each provided with an independent valve opening directly into the interior of the drum. The filtrate entering the drum from the filtrate compartments passes out of the drum through one of the hollow trunnions to a barometric leg or vacuum receiver.

In operation, the interior of the drum is maintained under subatmospheric pressure and the valves referred to are closed once during each revolution of the drum so as to seal the section or compartment being discharged from the action of vacuum within the drum. A filter of this type is shown in the Young Patent No. 2,052,156, and although this type of filter has a very high capacity, some trouble has been experienced with the individual gravity operated valves. It is frequently necessary to adjust these valves and since there are eighteen of them in an average size filter and since to adjust any one of them the filter must be shut down, a great deal of time is lost.

In general, the object of my invention is the provision of a non-sectionalized rotary drum filter having an unobstructed interior and provided with means for continuously blanking off that portion of the drum which is being discharged.

More specifically, the object of this invention is the provision of a non-sectionalized rotary drum filter wherein the interior of the drum is blanked off by a shoe so mounted as to contact and seal that portion of the drum which is being discharged of its cake.

Another object of this invention is the provision of means by which a positive clearance may be maintained between the inner periphery of the drum and a shoe used to blank off that portion of the drum being discharged.

The invention possesses other advantageous features, some of which with the foregoing will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Referring to the drawing.

Figure 1:
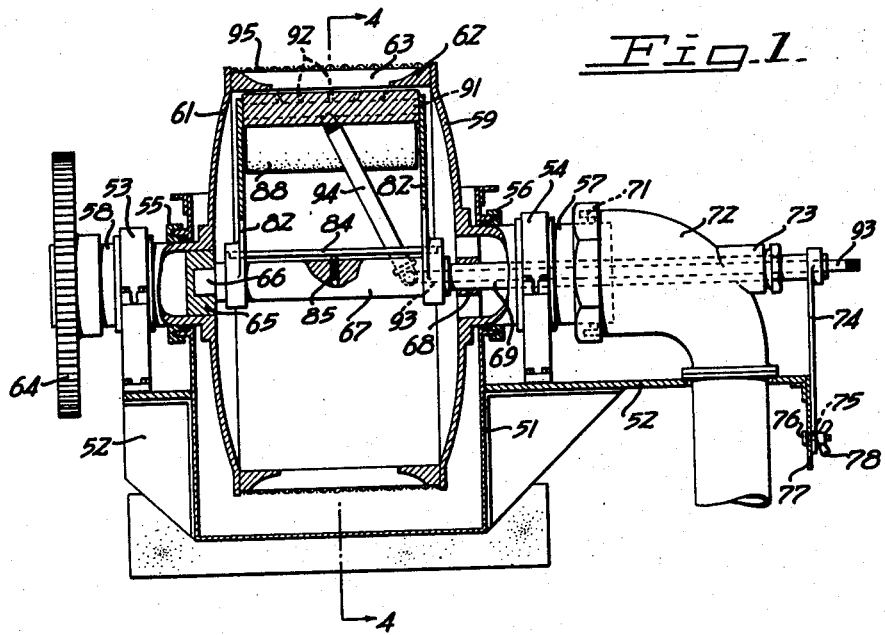
Figure 1 is a section of a rotary drum filter embodying the objects of my invention, taken on the line 3—3 of Figure 2.
Figure 2:
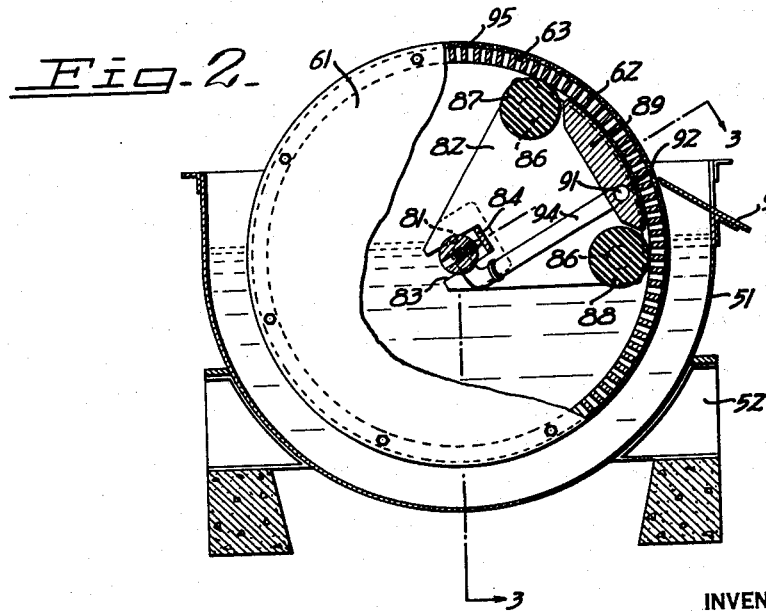
Figure 2 is a section taken on the line 4—4 of Figure 1.

As shown in Figures 1 and 2, my invention comprises a generally semi-cylindrical tank 51 mounted on a suitable frame 52. Journaled on bearings 53 and 54 carried by the frame 52 and passing through stuffing boxes 55 and 56 formed in the ends of the tank 51 are trunnions 57 and 58. Formed integral with the trunnions 57 and 58 are dished drum heads 59 and 61 between which is bolted and sealed a drum or cylinder 62 formed with milled slots 63 establishing communication between the exterior and interior of the drum. Carried on the outer end of the trunnion 58 is a ring gear 64 for driving the drum 62, and secured within the inner end of this trunnion is a bushing 65 within which is journaled a stub shaft 66 carried by a cylinder 67. Secured to the opposite end of the cylinder 67 and journaled in a spider 68 accommodated within the trunnion 57, is a shaft 69. Sealed to the outer end of the trunnion 57 by a stuffing box 71 is an elbow 72 formed with a stuffing box 73 through which the end of the shaft 69 passes. Keyed to the end of the shaft 69 is a sector 74 formed with an arcuate slot 75 for the accommodation of a bolt 76 secured to an extension 77 of the frame 52. The sector 74 may be secured in any desired angular position by a wing nut 78 threaded on the bolt 76.

The cylinder 67 is formed at either end with spaced parallel slots 81 for the reception of radially extending valve end plates 82. The valve end plates are formed with notches 83 for the accommodation of the cylinder 67 and a spring steel plate 84. Threaded diametrically through the cylinder 67 is a set screw 85, the outer end of which abuts the spring 84, thereby forcing the valve end plates 82 radially outward. Extending inwardly of the plates 82 are pins 86 in which are journaled parallel cylinders extending along the entire length of the drum 62. Secured between the valve end plates 82 and between the cylinders 87 and 88 is a shoe 89. The cylinders 87 and 88 are arranged for frictional engagement with the inner surface of the drum 62 and serve to maintain a positive clearance between the shoe 89 and the interior of the drum. Formed in the shoe 89 are a bore 91 and a series of outwardly extending openings 92 communicating with said bore. To the inner end of a pipe 93 extending through the shaft 69 is secured a pipe 94 communicating with the bore 91. The right hand end of the pipe 93 communicates with a source of fluid under pressure by which the under side of the drum 62 in registration with the shoe 89 may be subjected to a reverse pressure.

The drum 62 is covered with a suitable filter medium 95 and secured to the tank 51 is a doctor or scraper 96 arranged to discharge a cake formed on this filter medium.

From the above description it will be seen that the shoe 89 effectively blanks off that zone of the drum opposite the discharge means so as to relieve the inwardly directed differential filtering pressure and thereby permit the cake to be readily discharged. Since the shoe 89 is positively spaced from the drum, all frictional engagement between these two members is eliminated, and likewise the stress which would otherwise be placed on the drum trunnions due to the pressure of the shoe on only one side of the drum. Although the shoe 89 is positively spaced from the drum, an effective seal between the shoe and the drum is maintained due to the fact that the interior drum surface is always passing through the filtrate contained within the drum and consequently there is always present a liquid film between the drum and the shoe.

I claim:

1. A filter comprising: a tank; a closed-ended perforate drum mounted for rotation within said tank; means for maintaining said drum under an inwardly directed differential filtering pressure; discharge means adjacent one side of the exterior peripheral surface of said drum for removing cake formed thereon; a shoe mounted within said drum at a point opposite said discharge means for blanking off a longitudinally extending peripheral strip of said drum; and means for maintaining positive clearance between the shoe and the drum.

2. A filter comprising: a tank; a closed-ended perforate drum mounted for rotation within said tank; means for maintaining said drum under an inwardly directed differential filtering pressure; discharge means adjacent one side of the exterior peripheral surface of said drum for removing cake formed thereon; a shoe mounted within said drum at a point opposite said discharge means for blanking off a longitudinally extending peripheral strip of said drum; and a roll adjacent each longitudinal edge of said shoe for maintaining positive clearance between the shoe and the drum.

3. A filter comprising: a tank; a closed-ended perforate drum mounted for rotation within said tank; means for maintaining said drum under an inwardly directed differential filtering pressure; discharge means adjacent one side of the exterior peripheral surface of said drum for removing cake formed thereon; a central shaft carried by said drum; a pair of opposed supporting members carried by said shaft; a shoe carried by said shaft adjacent the inner surface of said drum and at a point opposite said discharge means; and a roller carried by said supporting members for engagement with the inner surface of said drum and for maintaining said shoe positively spaced from said drum.

FRANKLIN J. EVANS.